(12) United States Patent
Mankame et al.

(10) Patent No.: US 9,234,509 B2
(45) Date of Patent: Jan. 12, 2016

(54) QUICK-RETURN ACTIVE MATERIAL ACTUATOR

(75) Inventors: Nilesh D. Mankame, Ann Arbor, MI (US); Richard J. Skurkis, Lake Orion, MI (US); Mark A. Kramarczyk, Sterling Heights, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 547 days.

(21) Appl. No.: 13/114,731

(22) Filed: May 24, 2011

(65) Prior Publication Data

US 2012/0297763 A1 Nov. 29, 2012

(51) Int. Cl.
*F03G 6/06* (2006.01)
*F03G 7/06* (2006.01)

(52) U.S. Cl.
CPC ..................................... *F03G 7/065* (2013.01)

(58) Field of Classification Search
CPC ............. F03G 7/065; H02N 2/02; H02N 2/10
USPC ............................................ 60/527, 528, 529
See application file for complete search history.

(56) References Cited

U.S. PATENT DOCUMENTS

| | | | | |
|---|---|---|---|---|
| 3,016,691 A * | 1/1962 | Asakawa et al. | ................. | 60/528 |
| 4,463,560 A * | 8/1984 | Greenleaf et al. | ............... | 60/527 |
| 4,524,343 A * | 6/1985 | Morgan et al. | ................. | 337/140 |
| 4,605,104 A * | 8/1986 | Thompson | ................... | 188/72.4 |
| 4,811,564 A * | 3/1989 | Palmer | ............................. | 60/527 |
| 6,124,662 A * | 9/2000 | Maness | ......................... | 310/307 |
| 6,928,812 B2 * | 8/2005 | Donakowski et al. | .......... | 60/527 |
| 7,018,209 B2 * | 3/2006 | Schleppenbach et al. | ..... | 434/114 |
| 7,464,548 B2 * | 12/2008 | Yson et al. | ....................... | 60/527 |
| 7,770,391 B2 * | 8/2010 | Melz et al. | ....................... | 60/527 |
| 7,823,382 B2 * | 11/2010 | Ukpai et al. | ..................... | 60/527 |
| 2007/0267108 A1 * | 11/2007 | Ogura | ........................... | 148/402 |
| 2008/0034749 A1 * | 2/2008 | Ukpai et al. | ..................... | 60/527 |
| 2008/0034750 A1 * | 2/2008 | Gao et al. | ........................ | 60/527 |
| 2008/0128524 A1 * | 6/2008 | Minor et al. | ................... | 236/103 |
| 2009/0105649 A1 * | 4/2009 | Rush et al. | ..................... | 604/151 |

* cited by examiner

*Primary Examiner* — Jorge Pereiro
*Assistant Examiner* — Paul Thiede

(57) ABSTRACT

A quick-return active material actuator adapted for more rapidly returning a load, so as to reduce the de-actuation time of a system, includes in a first aspect a thermally activated active material actuation element drivenly coupled to the load, an active material de-actuation element drivenly coupled to the load non-antagonistic to the actuation element, and a reconfigurable mechanism interconnecting the elements and load, wherein the de-actuation element and mechanism are cooperatively configured to return the load while the actuation element is still activated, and, in a second aspect a thermally activated active material actuation element drivenly coupled to a biased load and operable to autonomously release, so that the load is caused to be returned while the actuation element is still activated, and subsequently re-engage the load.

21 Claims, 6 Drawing Sheets

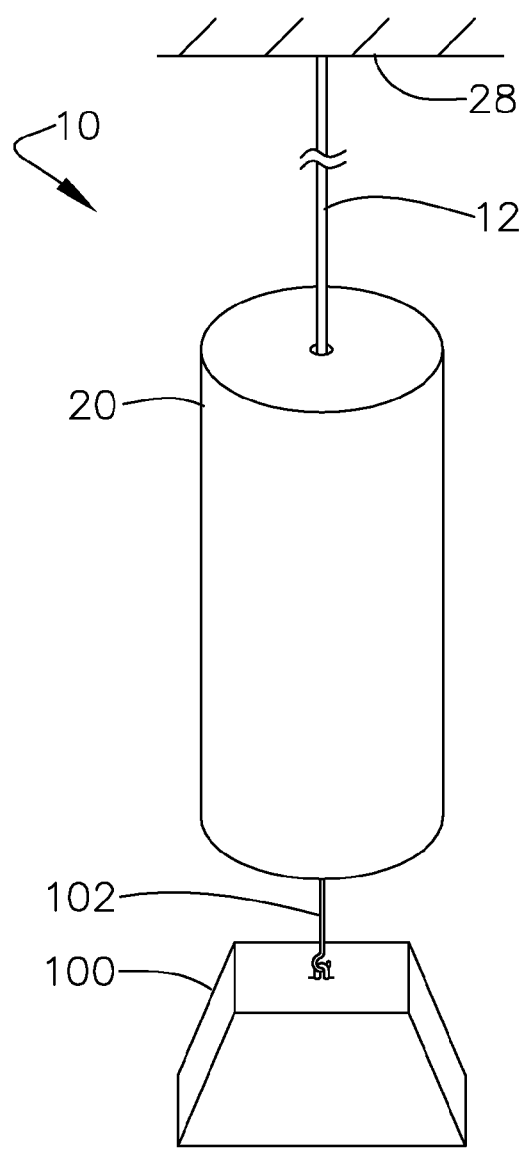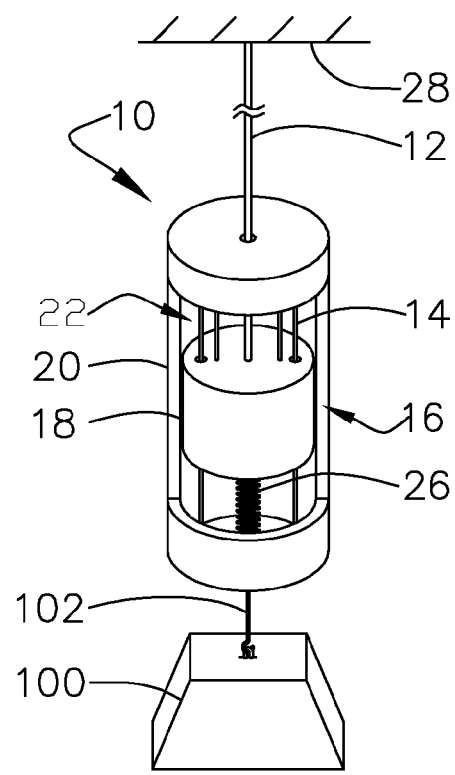

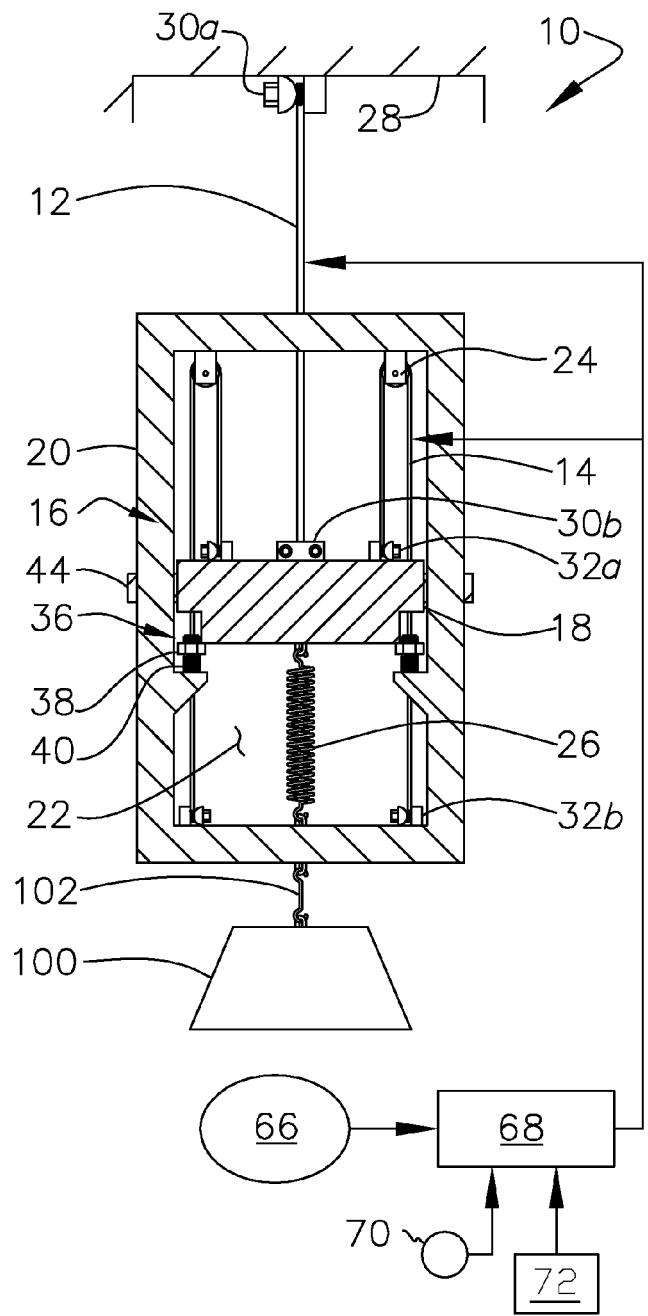
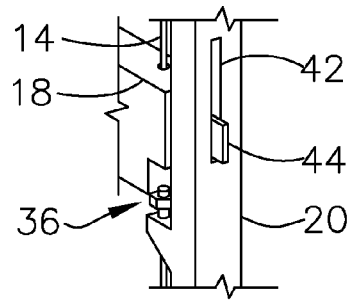
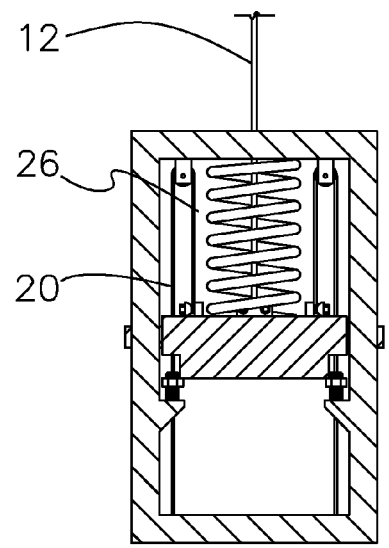
FIG. 3a
FIG. 3b
FIG. 3

QUICK-RETURN ACTIVE MATERIAL ACTUATOR

BACKGROUND OF THE INVENTION

1. Technical Field

This disclosure generally relates to active material actuators, and more particularly, to a quick-return active material actuator adapted for more rapidly returning a load, so as to decrease the de-actuation time of a system.

2. Background Art

Thermally activated active material actuators have been developed to more efficiently drive a load within a system, such as, for example, to drive the arm of a linkage system. In many applications, a reversible, or cyclic characteristic is often desirous and/or beneficial, wherein the load is caused to return to the original position as rapidly as possible. In these actuators, the oscillatory cycle produced is limited by the cooling period necessary to deactivate the actuator; wherein the cooling period is based, for example, on the cross-sectional area of the active material, and the heat transfer rate between the active material and its environment. Once the thermally activated actuator cools and deactivates, return elements such as antagonistically paired actuators, or biasing/energy storage elements (e.g., springs, etc.) are often used to return the load and reset the system. It is appreciated that where the actuator is caused to return prior to sufficiently cooling and deactivating, damage to the active material may result when threshold stresses are exceeded.

To reduce cooling period, and therefore, the de-actuation time of these systems, accelerated cooling measures have been developed, which include, for example, using forced air convection, and multiple actuators having smaller cross-sectional areas. However, these measures generally present various concerns in the art. For example, the addition of an ancillary cooling sub-system typically increases the complexity of the overall system, the packaging space required, and the operational/maintenance costs associated therewith. As such, there is a long felt need in the art for a thermally activated active material actuator that more efficiently reduces de-actuation time, thereby more rapidly effecting the return of a load.

BRIEF SUMMARY

In response to these and other concerns, the invention presents a quick-return thermally active material actuator adapted for reducing the de-actuation time of a system. The invention is useful for more rapidly de-actuating a system (i.e., returning the load), in comparison to conventional thermally activated active material actuators, by eliminating the cooling-period dependency of the actuator. In other words, the inventive actuator enables the load to return while the actuating active material element is still in the process of being de-activated. The invention also maintains the actuating active material under stress during its de-activation process. This is in contrast to other approaches for rapid return in thermally actuated systems, where the load may be physically decoupled from the thermal actuator to allow the load to return to its original configuration without waiting for the thermal actuator to de-activate completely. The characteristic de-activation temperature (the Martensite finish temperature or Mf for thermally activated SMA actuators) decreases with decreasing stress on the material. A drop in stress of roughly 5-10 MPa results in a reduction in the de-activation temperature of roughly 1 C for common SMA actuator materials. Therefore, maintaining the actuating actuator under stress during the de-activation process ensures that the de-activation temperature for that actuator remains high. This leads to a more rapid de-actuation as the rate of cooling decreases exponentially as the actuator temperature approaches the ambient temperature such that every 1 C of additional cooling requires a longer interval than its preceding 1 C drop in temperature.

Moreover, the present invention is useful for providing a system with inherent overload protection. Eliminating reliance upon a cooling period in some configurations is further useful for enabling desirable measures not previously available. For example, protective sleeves and other measures, though typically thermally insulating, may be used to encase or otherwise protect the actuating element from exposure to undesirable and/or damaging conditions. Also, by eliminating the cooling period necessary for return, the invention is useful for increasing maximum operating temperatures, and providing more uniform de-actuation times over variable operating temperatures. Finally, the need for accelerated cooling measures is eliminated, thereby reducing the complexity, mass, packaging requirements, and costs associated with the system.

In a first aspect of the invention, a quick-return actuator is adapted for more rapidly returning a load, so as to decrease the de-actuation time of a system. The actuator comprises an actuating active material element operable to undergo a first reversible change in fundamental property when exposed to a first external signal, so as to be activated. The actuating element is drivenly connectable to the load, such that the first change causes the load to move to a first actuated position. The actuator further includes a de-actuating active material element non-antagonistic to the first element, and operable to undergo a second reversible change in fundamental property when exposed to a second external signal. The de-actuating element is drivenly connectable to the load, such that the second change causes the load to move to a second position, and more preferably back to the home position, when the load is in the first position. Thus, de-actuation can be achieved in a time comparable to the actuation time. The elements are cooperatively configured such that the system reverts back to its original configuration when both changes are reversed.

In a second aspect of the invention, a quick-release actuator is adapted for autonomously releasing a biased load, so as to decrease the cycle time of a system. Here, the actuator comprises a driven member inter-linked with the load, and a first active material element operable to undergo a reversible change in fundamental property when exposed to an external signal, so as to be activated. The element is drivenly coupled to the member, such that the change is configured to move the load from an original and to a first actuated position, and autonomously disengage the member and load when the load achieves the first position. When disengaged, the load is caused to move back to the original position by a biasing force, and once the first element is deactivated a reset mechanism causes it to autonomously re-engage the load and member for subsequent actuation Other aspects and advantages of the present invention, including utilizing shape memory wire actuating and de-actuating element(s), biasing elements, such as springs, and a reconfigurable mechanism to effect the return of the load, will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 1 is a perspective view of a quick-return actuator drivenly coupled to a load, and including an actuation element, and a reconfigurable mechanism further including an external cylindrical member, in accordance with a preferred embodiment of the invention;

FIG. 2 is a perspective view of the inner-workings of the actuator shown in FIG. 1, further illustrating an internal cylindrical member translatably disposed within the external member, first and second de-actuation elements, and a biasing spring inter-engaging the members, in accordance with a preferred embodiment of the invention;

FIG. 3 is a cross-section of the quick-return actuator shown in FIG. 2 in a home position, and particularly illustrating the translatable members, the actuation and de-actuation elements, the biasing spring, and adjustable stops, in accordance with a preferred embodiment of the invention;

FIG. 3a is a perspective view of a portion of the actuator shown in FIG. 3, particularly illustrating a guide inter-engaging a guide slot, in accordance with a preferred embodiment of the invention;

FIG. 3b is a cross-section of the quick-return actuator shown in FIG. 3 in a home position, wherein the biasing spring presents a compression spring, in accordance with a preferred embodiment of the invention;

DETAILED DESCRIPTION

Figure 4:
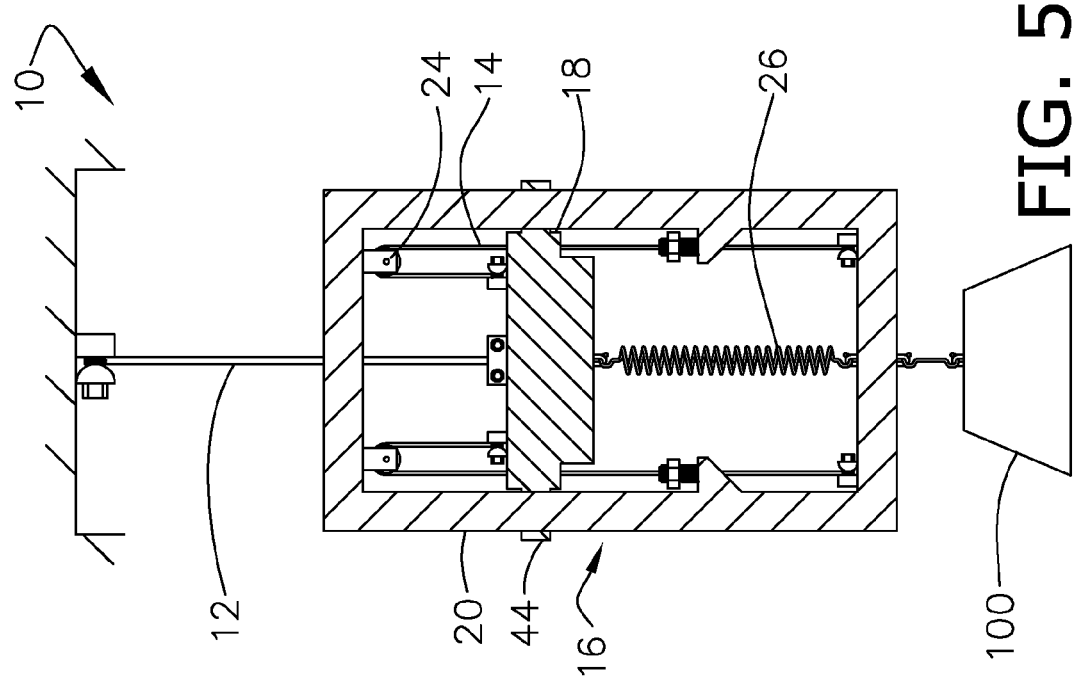
FIG. 4 is a cross-section of the quick-return actuator shown in FIG. 3, wherein the actuation element has been activated, and the load has been raised to a first (actuated) position.

The following description of preferred embodiments of the invention is merely exemplary in nature and is in no way intended to limit the invention, its application, or its uses. Disclosed herein is a quick-return, thermally activated actuator 10 adapted for more rapidly returning a load 100 (e.g., a weight (FIGS. 1-6), a lever (FIG. 7), a slider (FIGS. 9a-c), etc.) so as to decrease the de-actuation time of a system. As used herein, the term "cycle time" is defined as the period required to move the load 100 to an actuated position, plus the period required to move the load to a second position, wherein the second position is preferably congruent or substantially congruent to the home or original position so as to enable further actuation when the actuator 10 is ready to receive a subsequent signal (i.e., the actuator 10 is reset). The term "de-actuation time" is used to denote the time taken by the load to move from its first position to its second position, where the second position is preferably congruent or substantially congruent to the original position.

The invention can be employed in most mechanical systems where a more rapid return of the load 100 is desired, including safety and emergency systems, manufacturing, automotives, appliances, and games and toys. The actuator 10 includes an active (or "smart") material actuation (i.e., "actuating," or "actuator") element 12 that selectively causes the load 100 to translate to the actuated position. The present invention presents two methods or configurations effecting rapid return of the load 100 by eliminating dependency upon a cooling period for the element 12: using a combination de-actuation active material element 14 and reconfigurable mechanism 16, or by further using the actuating element 12 to selectively release, so as to enable the return of, the load 100, and then autonomously re-engaging the load 100. In the first method the load is always engaged with the main actuating element (12). The de-coupling between the main actuation element (12) and the load is purely functional and not physical.

I. Active Material Discussion and Functionality

As used herein the term "active material" is defined as those materials or composites that exhibit a reversible change in a (i.e., chemical or intrinsic physical) property when subjected to an activation signal. The inventive actuator 10 employs the reversible shape changing capabilities of certain active (or "smart") materials to cause the load 100 to translate. This invention is particularly useful for those actuation approaches where the actuation time is much less than the de-actuation time; and as such, suitable active materials for use herein include, without limitation, shape memory alloys (SMA), and ferromagnetic SMAs (FSMA), piezoelectric materials, electroactive polymers (EAP), magneto- and electrostrictives, and the like. Depending on the particular active material, the activation signal can take the form of, without limitation, an electric current, a temperature change, a magnetic field, a mechanical loading or stressing, and the like.

More particularly, shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as the Austenite start temperature (As). The temperature at which this phenomenon is complete is called the Austenite finish temperature (Af). When the shape memory alloy is in the Austenite phase and is cooled, it begins to change into the Martensite phase, and the temperature at which this phenomenon starts is referred to as the Martensite start temperature (Ms). The temperature at which Austenite finishes transforming to Martensite is called the Martensite finish temperature (Mf). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original annealed shape. Hence, one-way shape memory effects are only observed upon heating.

The temperature at which the shape memory alloy remembers its high temperature form when heated can be adjusted by slight changes in the composition of the alloy and through heat treatment. In nickel-titanium shape memory alloys, for instance, it can be changed from above about 130° C. to below about −100° C. The shape recovery process occurs over a range of just a few to several degrees and the start or finish of the transformation can be controlled to within a degree or two depending on the desired application and alloy composition. It is appreciated that the mechanical properties of the shape memory alloy vary greatly over the temperature range spanning their transformation.

Shape memory alloy materials exhibit a modulus increase of 2.5 times and a dimensional change of up to 8% (depending on the amount of pre-strain) when heated above its so-called Martensite to Austenite phase transition temperature. SMA can be incorporated within an actuator in wire form to provide the desired amount of contraction or change in stiffness properties, wherein the term "wire" is non-limiting and shall incorporate other suitable geometric shapes, such as cables, bundles, braids, ropes, straps, etc.

Where shape memory alloy changes are one-way, a biasing force member (such as a spring) may be used to counter act the actuator and cause a driven load or mechanism to return to the original configuration once the signal is removed and the SMA is allowed to deactivate. Return mechanisms may include mechanical, pneumatic, hydraulic, or pyrotechnic technology, or be based on one of the aforementioned smart materials.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Ferromagnetic shape memory alloys exhibit rapid dimensional changes of up to several percent in response to (and proportional to the strength of) an applied magnetic field. The changes are one-way changes and require the application of either a biasing force or a field reversal to return the ferromagnetic shape memory alloy to its starting configuration. Otherwise, for the intents and purposes of the present invention, ferromagnetic shape memory alloy functions equivalently to shape memory alloy.

Similarly, magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferrimagnetic solids. Terfenol D is the most thoroughly explored form of magnetostrictive. Magnetostrictives exhibit a relatively high frequency capability. Strain of a magnetostrictive is proportional to the strength of the applied magnetic field. These types of materials return to their starting dimension upon removal of the applied field.

II. Exemplary Quick-Return/Release Actuators and Methods of Use

Referring to FIGS. 1-7, a quick-return actuator 10 is adapted for more rapidly returning a load 100, so as to decrease the de-actuation time of a system, by effecting return of the load 100 without waiting for the actuating element 12 to be completely de-activated. The actuator 10 is interconnected, and more preferably o the load 100, e.g., via a reconfigurable mechanism 16 and a coupling 102 that transfer the drive force produced by the actuating element 12 to the load 100. In the illustrated embodiment, the actuation element 12 presents a wire comprised, for example, of SMA, that contracts up to the available strain (e.g., 8%) upon activation. Alternatively, it is appreciated that the element 12 may comprise other active materials such as EAP, FSMA, etc. The actuation element 12 is configured such that the change in its length is directly operable to cause the load 100 to move to the first actuated position.

The actuator 10 further includes a second (de-actuating) active material element (e.g., SMA wire, FSMA wire, piezoelectric composite, EAP tendon, etc.) 14 that is operable to undergo a reversible change in fundamental property, drivenly coupled to the load 100, and non-antagonistic to the actuating element 12. That is to say, the elements 12,14, when activated, produce forces that do not act in opposition to one another. As such, neither is required to overcome the actuation force of the other, or imposes a stress thereupon, when activated. It is appreciated that the non-antagonistic relationship enables de-actuation while the actuating wire 12 is still in the process of being de-activated. More particularly, the second fundamental change is operable to cause the load 100 to move to a second position after the load 100 achieves the actuated position. The second position may effect a full return, (i.e. reset the load 100 to the home position), a partial return, or an extended return (i.e., past home position), so long as the load 100 achieves a position that enables re-actuation, once both 12 and 14 have de-activated.

In the illustrated embodiments shown in FIGS. 1-7, the actuator 10 further includes a reconfigurable mechanism 16 intermediately interconnecting the actuation element 12 and the load 100. It is appreciated that the mechanism 16 also translates during actuation, so as to contribute to the actual load of the system. The de-actuation element 14 is drivenly coupled to at least a portion of the mechanism 16 and operable to cause it to shift between first and second configurations as a result of being activated.

The mechanism 16 includes a first (i.e., "internal", as illustrated) member 18 coupled to the actuation and de-actuation elements 12,14, and a second (i.e., "external", as illustrated) member 20 further coupled to the de-actuation element 14 and the load 100. The members 18,20 are configured to relatively translate when the de-actuation element 14 is activated, so as to cause the load 100 to move to the second position. As shown in the illustrated embodiment, the second member 20 may be tubular and define an interior space 22, wherein at least a portion of the first member 18 is disposed. It is appreciated that the members 18,20 may present other configurations, such as sliding plates, or otherwise telescoping structures. More preferably, the de-actuation element 14 and internal member 18 are substantially disposed within the space 22, so as to present a self-contained actuator 10.

In this configuration, the de-actuating element 14 is oppositely connected to the members 18,20, and is more preferably entrained by at least one pulley 24, so as to increase the functional length and available strain of the wire 14 (FIGS. 3-7). More preferably, the pulley(s) 24 and de-actuation element 14 are further configured to provide mechanical advantage. In FIG. 6a, for example, a plurality of pulleys 24 are configured to provide a force advantage correlative to the number of pulleys 24, which reduces the force required to be produced by the wire 14, as well as, the relative translation between the members 18,20. To compensate for reduced translation, it is appreciated that the de-actuation wire 14 may be laterally extended between fixed points, e.g., lubricated stationary rollers 34, along the inner wall of the external member 20 (FIG. 6a).

To retain the load 100 in the third (e.g., returned home) position, the de-actuating element 14 is sized relative to the actuation element 12 to effect the necessary cooling rates. Alternatively, the de-actuation element 14 may be thermally insulated or otherwise surface treated. It is appreciated that, where self-contained (FIGS. 1-7), the space 22 acts to insulate the de-actuation wire 14. Finally, in yet another alternative, a maintenance signal may be maintained in the de-actuation element 14 for a predetermined period, so as to control the power flowing therein and maintain the load in the third position.

As shown in FIGS. 3-7, the mechanism 16 includes a biasing member 26 that is drivenly coupled to the members 18,20, so as to produce a biasing force which drives the mechanism 16 towards the first configuration (FIGS. 3 and 4). In the illustrated embodiment, the biasing member 26 is a tension spring disposed beneath the internal member 18, and connected to the interior surface of the bottom cap of the external member 20; it is certainly within the ambit of the invention, however, to replace the tension spring with a compression spring 26 as shown in FIG. 3b. In this relationship, the spring 26 is configured to drive the internal member 18 towards the more medial position shown in FIGS. 3, 4, and 6. It is appreciated that the biasing force created is in accordance with the following relationship:

$$F = k_1 x_1 + F_0 \quad (1)$$

wherein (F) is the biasing force vector, ($k_1$) is the spring constant, ($x_1$) is the spring displacement vector, and $F_0$ is the preload in the spring. The spring 26 supplies a biasing force ($F=F_1$) value sufficiently large enough to ensure that the internal member 18 is pressed against the nut (38) with a non-zero load while the load 100 is being lifted to the first (i.e., actuated) position (FIG. 4). That is to say, the spring 26 has a sufficient pre-load to cause the entire mechanism 16 to be lifted, along with the load 100, without shifting the internal member 18 relative to the external member 20. It is appreciated that the ($F_1$) value must be selected in light of the anticipatory loads to be lifted. The pre-load in the spring 26 is achieved by adjusting the position of the nut 38 relative to the bolt 40 as shown in FIG. 3.

Figure 5:
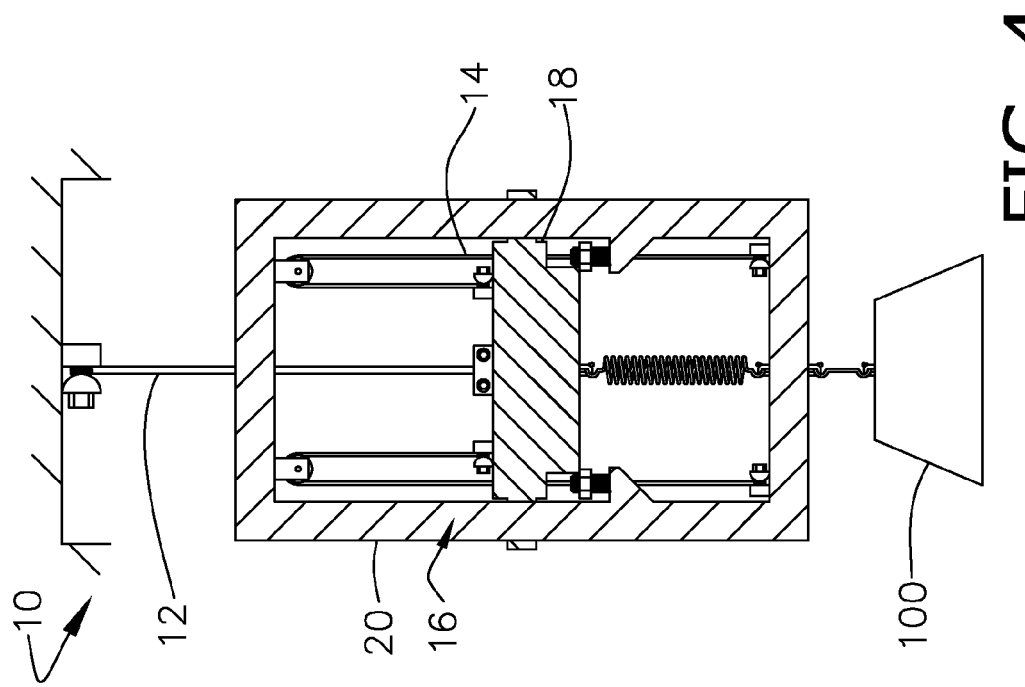
FIG. 5 is a cross-section of the quick-return actuator shown in FIGS. 3 and 4, wherein the de-actuation element has also been activated, and the load driven to a second (de-actuated) position preferably congruent to the home position.

Thus, in the illustrated embodiment, the spring 26 exerts an increasing biasing force (F) antagonistically to the action of the de-actuation element 14; and the second change must be configured to overcome the biasing force (F) minus the load 100 and cause the members 18,20 to relatively translate so that the mechanism 16 shifts (FIG. 5). Where multiple de-actuating wires 14 are used, each must present an actuation force correlative to the associated fraction; for example, it is appreciated that the dual wires 14 shown in the illustrated embodiment shown in FIGS. 3-5 must produce an actuation force greater than one-half of F. Alternatively, the multiple de-actuation elements 14 may operate redundantly.

The actuation element 12 is attached to an fixed structure or base 28 and first member 18 by securing fasteners, such as screw crimps 30a,b that electrically and, optionally, thermally isolate the element 12. The de-actuation elements 14 may be similarly attached to the members 18,20 on same-facing sides by screw crimps 32a,b. Other types of securing fasteners include, but are not limited to, welded connections, clamps, clips, and hooks.

Figure 6:
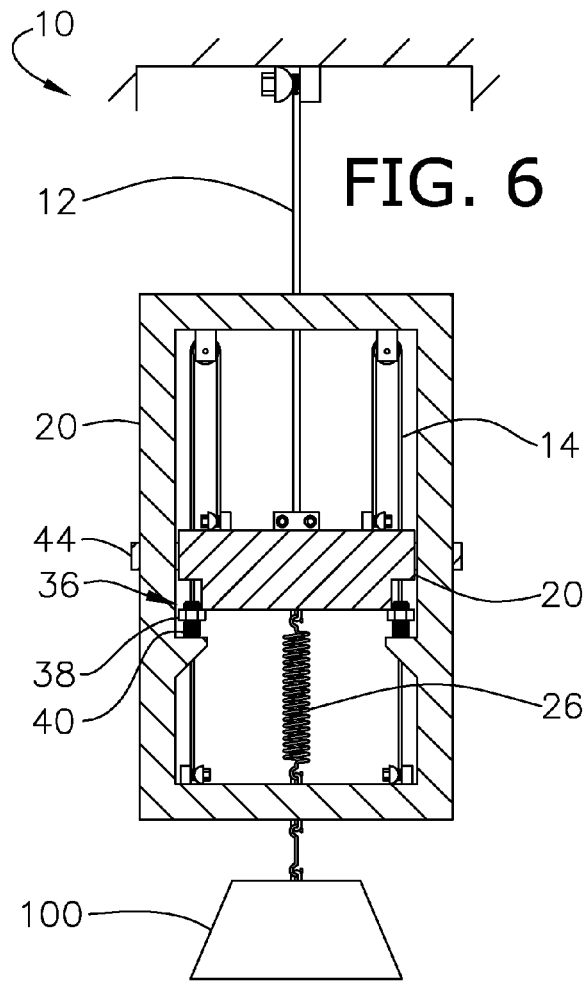
FIG. 6 is a cross-section of the quick-return actuator in FIGS. 3-5, wherein the actuation and de-actuation elements have been de-activated, thereby resetting the actuator.
Figure 6A:
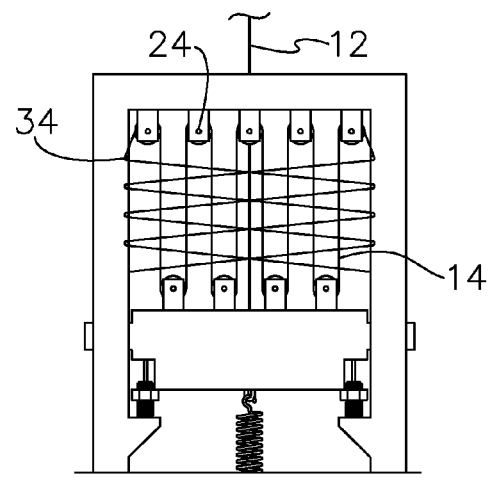
FIG. 6a is a partial elevation of the quick-return actuator shown in FIGS. 3-5, wherein a plurality of pulleys are used to provide mechanical advantage to the de-actuating element.

In a preferred embodiment, the second member 20 defines at least one adjustable stop 36 operable to limit relative displacement between the members 18,20 in a first direction (FIGS. 3-7) and to impose a pre-load on the spring 26. In the illustrated embodiment, the spring 26 is preferably stretched when the stop 36 is engaged, such that the stop 36 sustains a predetermined preload force ($F_0$) in the biasing member 26. For example, and as shown in FIGS. 3 and 6, the stop 36 may include a nut 38 co-axially threaded on a shaft 40. Here, the nut 38 is operable to prevent the internal member 18 from further movement towards the bottom of the external member 20; the stop 36 is adjusted by modifying the position of the nut 38 relative to the shaft 40. Alternatively, the nut 38 and shaft 40 may be replaced by the head and shaft of a threaded bolt (not shown), respectively. It is appreciated that the stop 36 provides a base for the spring 26 to compress the mechanism 16, and that adjusting the stop 36 enables pre-load in the spring 26 in the de-activated state to be controlled. By doing so, it is appreciated that a prescribed pre-load independent of the corresponding pre-stretch in the spring 26 can be achieved. That is to say, if the spring 26 gives over time, and the pre-stretch corresponding to the specified pre-load increases, the stop 36 needs only to be adjusted in order to get the right pre-load.

As best shown in FIG. 3a, the external member 20 preferably defines a guide slot 42, while the interior member 18 includes a guide 44, or vice-versa. The guide 44 extends laterally from the interior member 18 and runs vertically within the slot 42. The guide slot 42 is sufficiently narrow to limit torsional or fore-aft movement by the guide 44 within the slot 42. The slot 42 is of sufficient length to enable full motion, but prevents translation at its extremities, so as to act as a further stop.

Thus, in operation, activating the actuation element 12 (e.g. heating an SMA actuation element 12 to the Austenitic state) causes the load 100 and mechanism 16 to lift to the first position (FIG. 4). When the de-actuation element 14 is activated, the biasing spring 26 is stretched, and a potential energy is stored therein, by lowering the external member 20, and therefore load 100 to the second position in absolute space, and more preferably, back to its home or initial position (FIG. 5). In this configuration, it is appreciated that the mechanics of the system result in lowering the external member 20, as opposed to raising the internal member 18. Once the actuation and de-actuation elements 12,14 are deactivated, and the stored energy in the biasing member 26 is released, the first member 18 slides downward relative to the second member 20 until contacting the stop 36, and thus restoring the equilibrium in the system (FIG. 6). The actuator 10 is now ready for a subsequent actuation.

Figure 7:
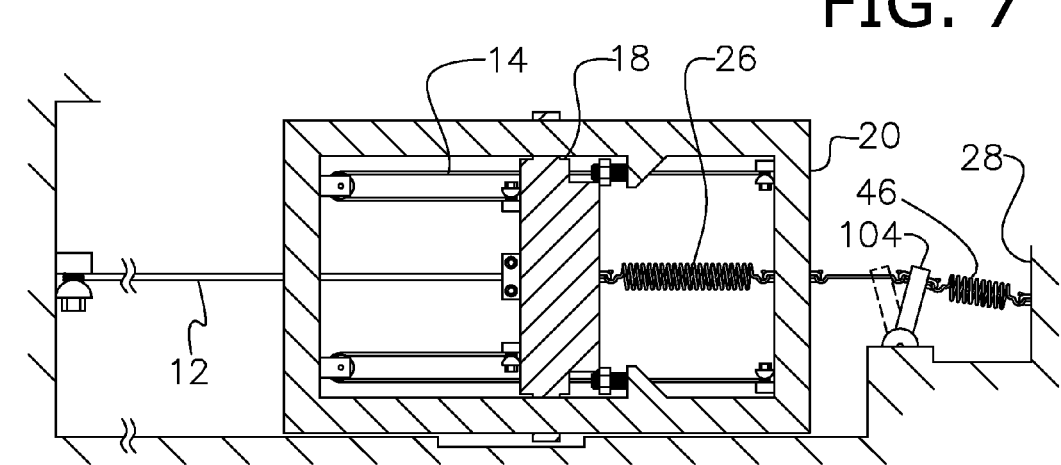
FIG. 7 is a cross-section of a horizontally oriented quick-return actuator, and a lever drivenly coupled to the actuator and a load biasing element, wherein the lever is pivotal between an un-actuated position (solid-line type), and actuated position (hidden-line type), in accordance with a preferred embodiment of the invention.

It is appreciated that, the invention may be oriented and performed at any angle, including horizontally, but is particularly suited for use where the external load presents a constant magnitude (e.g., where the load is a dead weight that is vertically oriented, or the load is a constant force spring). In FIG. 7, a horizontally oriented mechanism 16 is intermediate and distally connected to the actuating element 12 and a lever 104 pivotally attached to the fixed structure 28. Here, a load biasing member 46 external to the actuator 10, such as a tension spring, is intermediately disposed between the lever 104 and further fixed structure 28. The load biasing member 46 supplants gravity, as described with respect to FIGS. 3-6, and defines a load ($F_2$) sufficiently smaller than ($F_1$) such that the first change is configured to displace the load biasing member 46, but not the mechanism spring 26.

More particularly, the load biasing member 46 is configured to move the external member 20 and lever 104 to the de-actuated position (shown in solid-line type in FIG. 7), when the de-actuation element 14 undergoes the second change. Heating the actuation element 12 to the Austenitic state causes the lever 104 to pivot to the actuated position (shown in hidden-line type in FIG. 7), wherein the load biasing member 46 is stretched, and potential energy is stored therein. Activation of the de-actuation element 14, as described above, in conjunction with the stored energy in the load biasing member 46, causes the lever 104 to pivot to the second position.

Figure 8A:
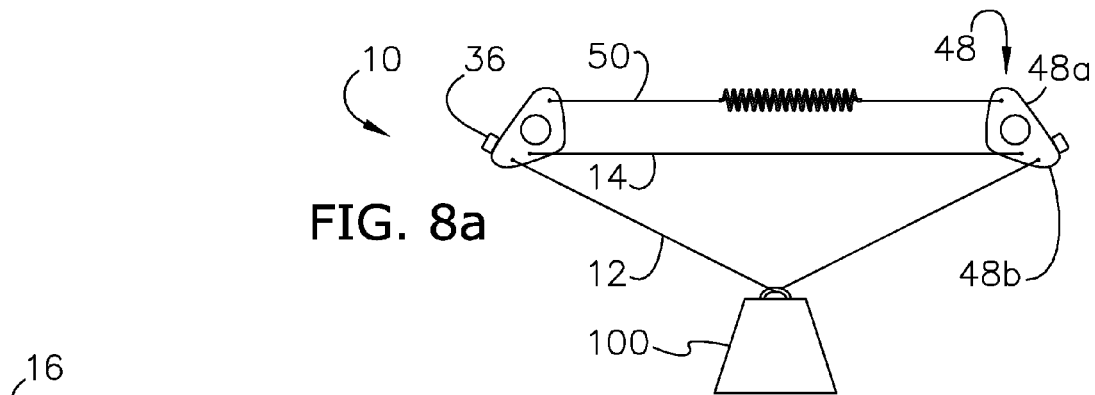
FIG. 8a is an elevation of a quick-return actuator drivenly coupled to a load in a nominal condition, and including a bow-string actuation element, a reconfigurable mechanism further including spaced pivot arms coupled to the bow-string element and defining a pivot axis, a wire de-actuation element coupled to the pivoting mechanisms, and an overload spring coupled to the pivoting mechanisms opposite the actuation and de-actuation elements, in accordance with a preferred embodiment of the invention.

FIGS. 8a-d present a different adaptation of the concept described in FIGS. 1-7, wherein the actuator 10 includes a bow-string actuation element 12. That is to say, the element (e.g., SMA wire) 12, during normal operation, is connected to fixed structure at its distal ends and engage the load 100 medially (FIGS. 8a,b). It is appreciated that the trigonometric relationship formed by the load 100 and element 12 provides displacement amplification for small values of the starting and ending angle defined by the bow-string element 12 and horizontal. By using a bow-string configuration, it is appreciated that the actuator 10 requires less packaging space than the first embodiment. Moreover, it is appreciated that the present actuator 10 requires less wire material (diametrically and/or lengthwise) for return (using the SMA element 14) than for actuation (using the SMA element 12), which may allow for automatic de-actuation in cases of excessive ambient temperatures.

Figure 8B:
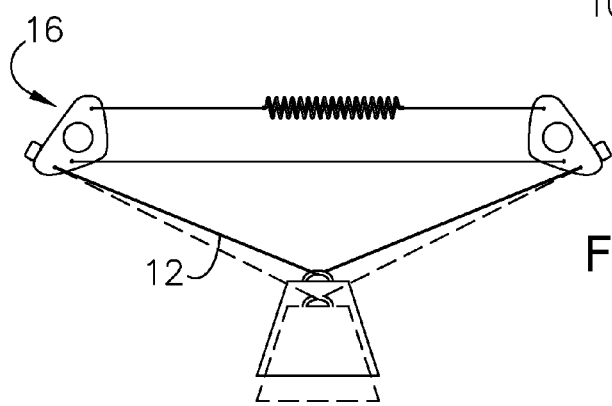
FIG. 8b is an elevation of the actuator shown in FIG. 8a, wherein the actuation element has been activated, so as to displace the load (the former position and/or condition of the elements, pivot arms, and/or elements being shown in hidden line type)
Figure 8C:
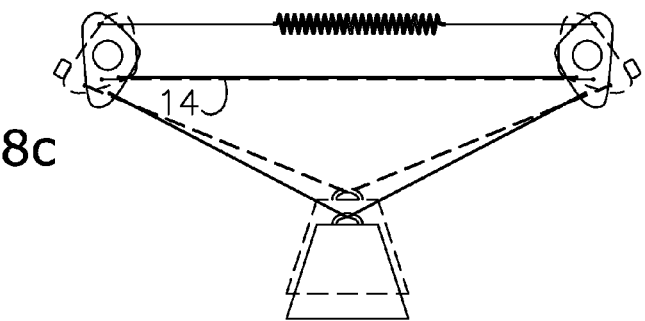
FIG. 8c is an elevation of the actuator shown in FIGS. 8a,b, wherein the de-actuation element has been activated after actuation, so as to return the load while the actuation element is still activated, and stretch the spring (the former position and/or condition of the elements, pivot arms, and/or elements being shown in hidden line type)

As shown in FIG. 8c, the actuator 10 further functions to effect a more rapid return of the load 100 that does not depend upon cooling of the actuation element 12. In this embodiment, the illustrated reconfigurable mechanism 16 includes first and second spaced apart and resistively pivotable pivot arms 48 that define pivot axes, p, and upper and lower sections 48a,b. Shifting the mechanism 16 concerns pivoting the arms 48 from a first (hidden line type in FIG. 8c) and to a second (solid line type in FIG. 8c) orientation. The bow-string actuation element 12 is coupled to the lower section 48b of the pivot arms 48 at its distal ends (FIG. 8a). The bow-string element 12 and arms 48 are cooperatively configured, such that activation of the bow-string element 12 does not cause the arms 48 to pivot, but instead causes the load 100 to displace (FIG. 8b).

The pivot arms 48 are further coupled to a de-actuation element (e.g., second SMA wire) 14 that extend laterally therebetween. The de-actuation element 14 is operable, when activated, to cause the lower sections 48b to rotate inwardly (i.e., towards each other) thereby shortening the distance between the distal ends of the actuation element 12 (FIG. 8c); by shortening this distance, the actuation element 12 slackens, and resultantly enables the load 100 to be returned by a biasing force (e.g., gravity), while the actuation element 12 is still activated and under tension. It is appreciated that the de-actuation element 14 provides automatic de-actuation, where ambient temperatures are sufficient to actuate both elements 12,14.

Lastly, an overload spring 50 is also coupled to the pivoting arms 48 on the opposite side of the axes relative to the elements 12,14 (FIGS. 8a-d). As such, the spring 50 exerts a biasing force when caused to store energy that drives the arms 48 to rotate in one of clockwise and counter clockwise directions (FIG. 8c-d), while the elements 12,14 cause the arms 48 to rotate in the other when activated. More preferably, and as shown in the illustrated embodiment, an extension spring 50 is distally connected to the upper section 48a of the arms 48 and extends laterally therebetween; the spring 50 is configured to cause the upper sections 48a to rotate inwardly and the lower sections 48b outwardly. This drives the elements 12,14 and actuator 10 back towards the nominal condition (FIG. 8a), such that the spring 50 serves as an overload mechanism for the actuation element 12, and a return mechanism for the de-actuation element 14.

More preferably, adjustable mechanical stops 36 are included to prevent the outward motion of the pivot arms 48 under the action of the overload spring 50. Under normal operation (FIGS. 8a-b), the overload spring 50 pivots the arms 48 until they rest against the stops 36 with a non-zero reaction force. Actuation of the main element 12 reduces this reaction force, but it still remains non-zero. Actuation of the de-actuation element 14, whether actively or passively, causes the overload spring 50 to be overcome by the de-actuation element 14 and consequently to pivot the arms 48 such that they move away from the mechanical stops 36 and cause de-actuation. As in the previous embodiment, the spring 50 is pre-loaded, with the pre-load being adjustable by repositioning the stops 36.

Figure 8D:
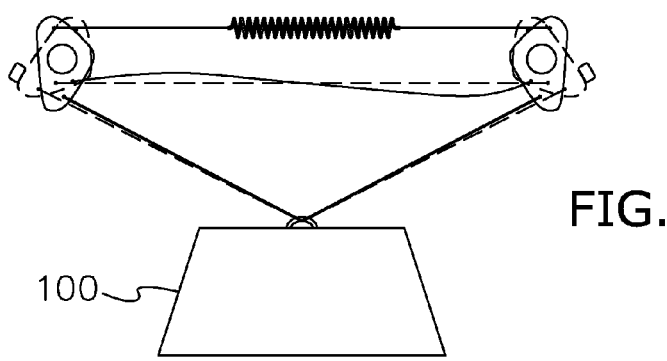
FIG. 8d is an elevation of the actuator shown in FIGS. 8a-c, wherein the actuation element has been activated but the load is too great, thereby causing the pivot arms to rotate and the overload spring to stretch (the former position and/or condition of the elements, pivot arms, and/or elements being shown in hidden line type)

Finally, in either embodiment, the spring 50 or 26, actuation element 12, and load 100 are cooperatively configured, such that the actuation element 12 is operable to cause the mechanism 16 to shift and spring 50 or 26 to stretch, when activated but unable to displace the load 100, due to excessive weight, blockage, etc. (as shown in FIG. 8d). This protects the actuation element 12 from overload conditions such as those caused by obstruction to motion of the load.

Figure 9A:
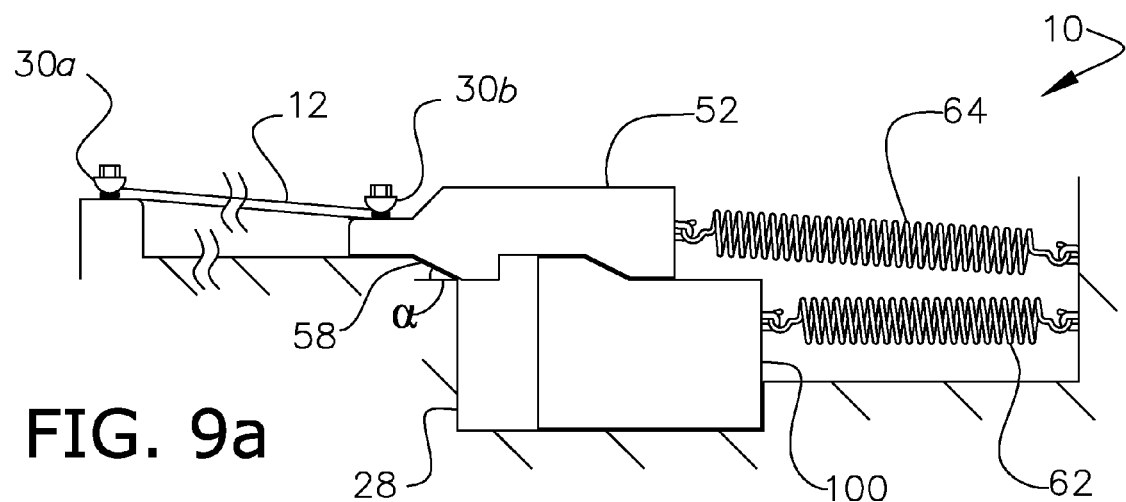
FIG. 9a is an elevation of a quick-release actuator drivenly coupled to a load, and having an actuation element and a driven member coupled thereto, wherein the driven member is configured to selectively disengage the load, when the load is in an actuated position, in accordance with a preferred embodiment of the invention.
Figure 9B:
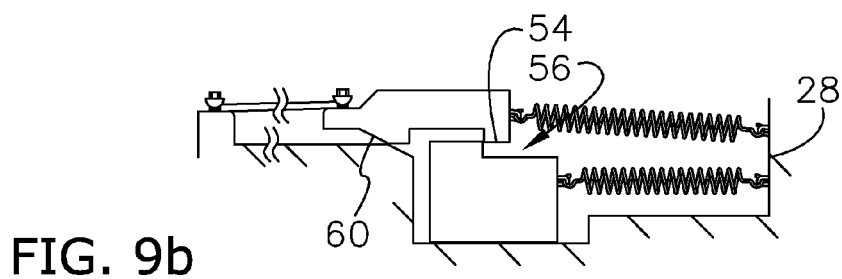
FIG. 9b is an elevation of the actuator shown in FIG. 9a, wherein the element has been activated, the load translated to the actuated position, and the member and load caused to disengage.
Figure 9C:
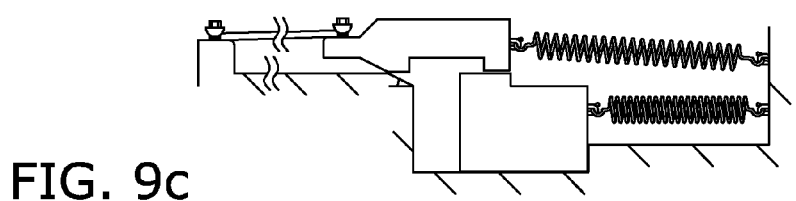
FIG. 9c is an elevation of the actuator shown in FIGS. 9a and b, wherein the member and load have been disengaged, and the load caused to travel back to the home position.

In another aspect of the invention, the actuator 10 is configured to autonomously release the load 100 so as to enable its quick return by a return mechanism drivenly coupled thereto. For example, and as exemplarily shown in the illustrated embodiment (FIGS. 9*a-c*), the actuator 10 may include a driven member 52 that is inter-linked with and rests upon a biased load 100, which acts as a slider. In one example, the slider may quickly open and close an electric circuit, so as to toggle an output. More particularly, the illustrated member 18 and load 100 are inter-linked through selectively inter-engaged faces defined by a distending lip 54 comprising the member 52, and a concavity or cut-out 56 defined by the load 100 (FIGS. 9*a-c*). When the lip 54 is inserted within the concavity 56, the member 52 is operable to pull the load 100 to an actuated position.

The actuator 10 is cooperatively configured with an adjacent fixed structure 28 that defines a sloped surface 58. The member 52 defines a chamfered edge 60 of congruent slope, and is configured to engage the surface 58 when the member 52 and load 100 achieve the actuated position. Through this inter-engagement the surface 58 and member 52 are cooperatively configured to autonomously cause the member 52 and load 100 to disengage by lifting the lip 54 from the concavity 56. More particularly, to minimize the lifting force required, the surface 58 and chamfered edge 60 define an angle, $\alpha$, with horizontal that is preferably between 20 to 45 degrees, more preferably between 25 to 35 degrees, and most preferably, 30 degrees (FIGS. 9*a-c*).

Once disengaged, a biasing force acting upon the load 100 causes it to return to the home position. For example, an extension spring 62 (FIGS. 9*a-c*) interconnecting the load 100 and adjacent fixed structure 28, may be used to return the load 100. In some applications, the external load 100 may be connected to a dead weight that serves to return the load 100 to its initial configuration. The load 100 and member 52 are further cooperatively configured such that the lip 54 continues to rest upon the load 100 in the disengaged condition. Finally, once the actuation element 12 de-activates a reset mechanism 64, such as yet another extension spring, may be drivenly coupled to the member 52, also connected to the adjacent fixed structure 28, and configured to drive the member 52 back towards a re-engaged condition relative to the load 100 when the load 100 is in the home position. As illustrated, the preferred spring 64 may be angularly oriented so as to produce a downward force vector acting upon the member 52, that further secures the resultant re-engagement. It is appreciated that the reset mechanism 64 is antagonistic to the element 12, and is therefore, cooperatively configured therewith.

Finally, in each of the afore-mentioned aspects, embodiments, and/or configurations, it is appreciated that a power source 66 is communicatively coupled to the de-actuation element 14, and preferably the actuation element 12, which may otherwise be passively activated. The power source 66 is operable to generate the activation signal (FIG. 3). For example, the source 66 may be a vehicle charging system, a capacitor operable to effect a sufficient discharge of energy, a wall outlet, or a battery. In a preferred embodiment, and as shown schematically in FIG. 3, an intermediate controller 68 is communicatively coupled to the active material element(s) 12,14 and source 66. As previously mentioned, the controller 68 may be programmably configured to autonomously manipulate (e.g., turn off/on, maintain, delay, etc.) the activation signal. Where both the elements 12,14 are coupled thereto, the controller 68 may be configured, for example, to determine when the actuation element 12 has been activated (e.g., by monitoring the change in resistance offered thereby), and activate the de-actuation element 14 only when the actuation element has been activated. More preferably, the controller 68 is configured to activate the de-actuation element 14 and maintain activation in such a manner as to retain the load in the third position without drift or oscillation.

A sensor 70 and/or input device 72, for event/condition triggered operation and on-demand activation, respectively, may be communicatively coupled to the controller 68, so as to offer logical input thereto. The sensor 70 and/or input device 72 are operable to determine an event/condition and deliver an input to the controller 68, when the event/condition is determined; with respect to the input device 72 it is appreciated that determining an event/condition includes receiving a manual input or voice command from the user. Finally, the preferred controller 68 is configured to respond to inferred (via internal logic) conditions of the system, based on, for example, the load, actuator 12, ambient conditions, and vehicle conditions. The sensor 70 and/or input device 72, and controller 68 are cooperatively configured to manipulate the signal when the event/condition is determined. Types of sensors include, but are not limited to, thermometers, position sensors, pressure sensors, displacement sensors, velocity sensors, and accelerometers.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Ranges disclosed herein are inclusive and combinable (e.g. ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g. the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A quick-return actuator comprising:
an actuating SMA wire operable to undergo a reversible change in length that includes a first change in length when exposed to a first external signal so as to be in a first activated state, and drivenly connectable to a load such that the first change causes the load to move from a home position to a first position;
a de-actuating SMA wire non-antagonistic to the actuating SMA wire, the de-actuating SMA wire operable to undergo a reversible change in length that includes a second change in length when exposed to a second external signal so as to be in a second activated state, and drivenly connectable to the load such that the second change causes the load to move from the first position to a second position; and
an external member having an insulated interior space with the de-actuating SMA wire disposed therein, wherein:
the de-actuating SMA wire is to be insulated from the first external signal, thereby rendering the de-actuating SMA wire unresponsive to the first external signal;
the second external signal is allowed to pass to the de-actuating SMA wire;
wherein:
the actuating SMA wire is in a first de-activated state when the actuating SMA wire undergoes a reversal of the first change in length;
the de-actuating SMA wire is in a second de-activated state when the de-actuating SMA wire undergoes a reversal of the second change in length; and
the actuating SMA wire and the de-actuating SMA wire are cooperatively configured such that the actuating SMA wire is operable to re-undergo the first change in length when re-exposed to the first external signal to move the load to the first position when:
the load is in the second position;
the actuating SMA wire is in the first de-activated state; and
the de-actuating SMA wire is in the second de-activated state.

2. The actuator as claimed in claim 1, further comprising a reconfigurable mechanism drivenly coupled to the actuating SMA wire and the load, and configured to shift from a first configuration to a second configuration as a result of the second change in length, such that the load achieves the second position as a result of shifting the reconfigurable mechanism to the second configuration.

3. The actuator as claimed in claim 2, wherein the reconfigurable mechanism includes the external member and an internal member that are mutually relatively translatable, the external member is drivenly coupled to the de-actuating SMA wire, such that the second change in length causes the external member to translate relative to the internal member, and the reconfigurable mechanism is caused to shift to the second configuration by translating the external member.

4. The actuator as claimed in claim 3, wherein at least a portion of the external member is tubular and defines the interior space, and at least a portion of the internal member is disposed within the interior space.

5. The actuator as claimed in claim 3, wherein the reconfigurable mechanism further includes at least one adjustable stop configured to impose a prescribed pre-load on a spring and to constrain the relative motion of the translatable internal member and the translatable external member.

6. The actuator as claimed in claim 3, wherein the reconfigurable mechanism further includes a biasing member drivenly coupled to the internal member and the external member, so as to produce a biasing force thereupon, wherein the force drives the reconfigurable mechanism towards the first configuration, and the second change is configured to overcome the biasing force and cause the external member to translate relative to the internal member.

7. The actuator as claimed in claim 6, wherein the de-actuating SMA wire, the internal member, the external member, and the biasing member are cooperatively configured such that the biasing member imposes a prescribed pre-load on the external member when the load is in the home position.

8. The actuator as claimed in claim 2, wherein the reconfigurable mechanism includes a first pivot arm and a second pivot arm, each defining a respective pivot axis.

9. The actuator as claimed in claim 8, wherein:
each respective pivot axis defines an upper section and a lower section of the respective arms;
the actuating SMA wire and de-actuating SMA wire are drivenly connected to one of the upper section and the lower section; and
the actuator further comprises an overload spring drivenly connected to the other of the upper section and the lower section.

10. The actuator as claimed in claim 1, wherein:
the de-actuating SMA wire has an available functional length and an available strain; and
the actuator further comprises at least one pulley entraining the de-actuating SMA wire, so as to bend the de-actuating SMA wire and increase the available strain of the de-actuating SMA wire.

11. The actuator as claimed in claim 10, wherein the at least one pulley and the de-actuating SMA wire are cooperatively configured, so as to provide mechanical advantage to the de-actuating SMA wire.

12. The actuator as claimed in claim 1, further comprising:
a power source communicatively coupled to the de-actuating SMA wire, and operable to generate the second external signal; and
a controller communicatively coupled to the actuating SMA wire, the de-actuating SMA wire, and the power source, and programmably configured to control the second external signal based on inferred states, internal logic, or a combination thereof.

13. The actuator as claimed in claim 12, further comprising at least one sensor or input device communicatively coupled to the controller, and operable to determine an event or condition and to deliver an input to the controller when the event or condition is determined, wherein the at least one sensor or input device and the controller are cooperatively configured to manipulate the first external signal, the second external signal, or both the first external signal and the second external signal when the event or condition is determined.

14. The actuator as claimed in claim 1, wherein the actuating SMA wire presents a bow-string configuration, and engages the load medially.

15. The actuator as claimed in claim 1 wherein the first external signal and the second external signal are separate thermal signals.

16. The actuator as claimed in claim 1 wherein the second position is the home position.

17. A quick-release actuator adapted for autonomously releasing a biased load, the quick-release actuator comprising:
a fixed structure configured to support a driven member for relative motion in a horizontal direction between the fixed structure and the driven member, the fixed structure including a sloped surface;

the driven member including a chamfered edge and operable to engage the load, the chamfered edge of the driven member configured to be slideably engaging with the sloped surface of the fixed structure so the fixed structure supports relative motion between the driven member and the fixed structure along a direction of travel of the driven member, the sloped surface and the chamfered edge each having an angle of measure relative to the horizontal direction from about 20 degrees to about 45 degrees; and an SMA wire operably drivenly coupled to the driven member and operable to undergo a reversible change in length that includes a first change in length when exposed to an external signal, wherein:

when the SMA wire is exposed to the external signal, the first change in length occurs to the SMA wire such that the load is moved from a home position to a first position such that the chamfered edge of the driven member slideably moves along the sloped surface of the fixed structure; and the first change of length of the SMA wire, the sloped surface, and the chamfered edge collectively cooperating together to allow the driven member to autonomously disengage from the load when the load attains the first position so that the load is able to return back to the home position.

18. The actuator as claimed in claim 17, further comprising a biasing member drivenly coupled to the load, and configured to return the load to the home position, when the driven member and load are disengaged.

19. The actuator as claimed in claim 18, wherein the biasing member includes a spring drivenly coupled to the load.

20. The actuator as claimed in claim 17, further comprising a reset mechanism drivenly coupled to the driven member, antagonistic to the SMA wire, and configured to autonomously re-engage the driven member and the load when the first change in length of the SMA wire is reversed and the load returns to the home position.

21. The actuator as claimed in claim 20, wherein the reset mechanism includes a spring drivenly coupled to the driven member.

\* \* \* \* \*